(12) United States Patent
Kwon et al.

(10) Patent No.: US 9,955,217 B2
(45) Date of Patent: Apr. 24, 2018

(54) IP ADDRESS ACQUISITION METHOD FOR CONTROLLING STANDBY MODE OF SET-TOP BOX, AND SET-TOP BOX AND POWER MANAGEMENT SERVER PERFORMING THE METHOD

(71) Applicant: Electronics and Telecommunications Research Institute, Daejeon (KR)

(72) Inventors: Eun Jung Kwon, Daejeon (KR); Sung Won Byon, Seongnam-si (KR); Jung Hak Kim, Daejeon (KR); Young Soo Park, Daejeon (KR); Hyun Ho Park, Daejeon (KR); Yong Tae Lee, Daejeon (KR); Eui Suk Jung, Daejeon (KR); Won Ryu, Seoul (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/164,254

(22) Filed: May 25, 2016

(65) Prior Publication Data

US 2017/0094348 A1 Mar. 30, 2017

(30) Foreign Application Priority Data

Sep. 24, 2015 (KR) .................. 10-2015-0135337

(51) Int. Cl.
*H04N 21/443* (2011.01)
*H04N 21/222* (2011.01)
(Continued)

(52) U.S. Cl.
CPC .......... *H04N 21/4436* (2013.01); *H04N 5/45* (2013.01); *H04N 21/2221* (2013.01);
(Continued)

(58) Field of Classification Search
None
See application file for complete search history.

(56) References Cited

U.S. PATENT DOCUMENTS

| | | | |
|---|---|---|---|
| 6,178,447 B1 * | 1/2001 | Wannenmacher | .... H04J 3/1694 375/222 |
| 7,089,579 B1 * | 8/2006 | Mao | ................... H04N 7/17318 348/E7.071 |

(Continued)

*Primary Examiner* — Jonathan V Lewis
(74) *Attorney, Agent, or Firm* — NSIP Law (57) ABSTRACT

A method of acquiring an Internet protocol (IP) address to control a standby mode of a set-top box, and the set-top box and a power management server performing the method are disclosed. The method may include determining whether a state of the set-top box changes from a broadcasting state in which a broadcasting service is provided to a passive standby state in which a network connection between the set-top box and a headend providing the broadcasting service is blocked, receiving state information associated with an IP address allocated to the set-top box for the network connection in response to the state of the set-top box changing to the passive standby state, and transmitting, to the set-top box, a state change command to maintain the network connection for the IP address allocated to the set-top box based on the received state information.

18 Claims, 8 Drawing Sheets

(51) Int. Cl.
*H04N 21/643* (2011.01)
*H04N 21/6543* (2011.01)
*H04N 21/24* (2011.01)
*H04N 5/45* (2011.01)

(52) U.S. Cl.
CPC ....... *H04N 21/24* (2013.01); *H04N 21/64322* (2013.01); *H04N 21/6543* (2013.01)

(56) References Cited

U.S. PATENT DOCUMENTS

| | | | | |
|---|---|---|---|---|
| 7,379,992 | B2* | 5/2008 | Tung | H04L 12/12 709/223 |
| 7,774,521 | B2* | 8/2010 | Gupta | G06F 13/102 710/52 |
| 7,848,271 | B2* | 12/2010 | Salomone | H04W 52/0229 370/310 |
| 8,315,314 | B2* | 11/2012 | Knutson | H04N 21/234309 348/471 |
| 8,392,561 | B1* | 3/2013 | Dyer | H04L 63/0281 455/466 |
| 8,427,991 | B2* | 4/2013 | Kholaif | H04W 12/04 370/311 |
| 8,509,954 | B2* | 8/2013 | Imes | H04L 67/42 700/286 |
| 8,621,527 | B2* | 12/2013 | Couleaud | H04H 20/62 725/149 |
| 8,959,556 | B2* | 2/2015 | Stokes | H04H 60/32 725/132 |
| 9,355,559 | B1* | 5/2016 | Bowen | H04L 67/16 |
| 9,577,797 | B1* | 2/2017 | Pomeroy | H04L 1/24 |
| 2002/0124266 | A1 | 9/2002 | Blanchard | |
| 2002/0138561 | A1* | 9/2002 | Chatfield | H04L 12/2856 709/203 |
| 2002/0145621 | A1* | 10/2002 | Nguyen | H04N 5/45 715/718 |
| 2005/0229226 | A1* | 10/2005 | Relan | H04H 60/33 725/114 |
| 2007/0130598 | A1* | 6/2007 | Choi | H04B 3/54 725/100 |
| 2007/0136767 | A1 | 6/2007 | Choi et al. | |
| 2007/0162929 | A1* | 7/2007 | Mickle | H04L 12/2697 725/37 |
| 2008/0209496 | A1* | 8/2008 | Jung | G06F 3/14 725/131 |
| 2010/0031297 | A1* | 2/2010 | Klein | H04L 12/12 725/78 |
| 2010/0321587 | A1* | 12/2010 | Kerofsky | G09G 3/3406 348/730 |
| 2011/0062794 | A1* | 3/2011 | Vergoossen | H04L 12/12 307/125 |
| 2011/0307932 | A1* | 12/2011 | Fan | H04N 21/2547 725/110 |
| 2013/0091280 | A1* | 4/2013 | Rajakarunanayake | G06Q 50/01 709/225 |
| 2013/0214600 | A1* | 8/2013 | Van De Poel | H04N 21/4436 307/31 |
| 2013/0298174 | A1* | 11/2013 | Palm | H04L 12/12 725/80 |
| 2014/0047495 | A1* | 2/2014 | Yun | H04N 21/4436 725/132 |
| 2014/0240607 | A1* | 8/2014 | Truong | H04N 5/63 348/730 |
| 2014/0359677 | A1* | 12/2014 | Ogle | H04N 21/4131 725/82 |
| 2015/0067815 | A1* | 3/2015 | Overcash | G06F 1/32 726/11 |
| 2016/0014444 | A1* | 1/2016 | Wei | H04M 1/72533 725/28 |

\* cited by examiner

IP ADDRESS ACQUISITION METHOD FOR CONTROLLING STANDBY MODE OF SET-TOP BOX, AND SET-TOP BOX AND POWER MANAGEMENT SERVER PERFORMING THE METHOD

CROSS-REFERENCE TO RELATED APPLICATION

This application claims the priority benefit of Korean Patent Application No. 10-2015-0135337, filed on Sep. 24, 2015, in the Korean Intellectual Property Office, the disclosure of which is incorporated herein by reference.

BACKGROUND

1. Field

Embodiments relate to a method of acquiring an Internet protocol (IP) address, and a set-top box and a power management server performing the method, and more particularly, to a method of acquiring an IP address to reduce an amount of standby power used in a set-top box by controlling a state of the set-top box entering a standby state using a network at a remote location.

2. Description of the Related Art

A state of an Internet protocol television (IPTV) set-top box is classified into an ON state, a standby state, and an OFF state based on whether a broadcast is viewed or not. The standby state of the set-top box indicates that a display of the set-top box is turned off because the broadcast is not viewed. In the standby state, standby power of the set-top box may be more than 10 times greater than power of an image-related home appliance used in a general house.

To reduce such an excessive amount of the standby power of the set-top box, the standby state of the set-top box may be classified into an active standby state and a passive standby state. That is, the standby power of the set-top box is classified into an active standby state power consumption and a passive standby state power consumption. A maximum of 10 watts (W) may be allowable for the active standby state power consumption, and a maximum of 1 W may be allowable for the passive standby state power consumption.

Here, the active standby state power consumption is greater than the passive standby state power consumption because a background function of the set-top box, for example, a network connection, a remote control receiver, a broadcasting tuner, and a decoder, operates in an activated state although the set-top box is powered off by a manipulation of a user. That is, when the set-top box is in the active standby state, an additional amount of power may be required to maintain such an operation of the background function. Conversely, when the set-top box is in the passive standby state, only a minimum amount of power may be required because the background function of the set-top box enters an inactivated state and only an input function of a remote controller is activated.

Thus, to reduce the standby power of the set-top box more effectively, using a section of the passive standby state may be more effective than using a section of the active standby state. However, since the set-top box provides a broadcasting service, the set-top box may update, in real time, electronic program guide (EPG) information transmitted from a headend at predetermined intervals, or a firmware or client access server (CAS) message. The set-top box may perform the updating through a network connection to the headend by activating a network connection function.

Here, the set-top box may receive an IP address allocated for the network connection from a dynamic host configuration protocol (DHCP) server, and the allocated IP address may be retrieved by the DHCP server after a predetermined period of time elapses. For example, when a lease time for the IP address allocated to the set-top box by the DHCP server is 60 minutes, the set-top box may make a request of the DHCP server to ask whether the set-top box continuously uses the allocated IP address for the rest 30 minutes at a point in time when 30 minutes, or ½ of 60 minutes, elapse. When the set-top box does not receive a response to such a request, the set-top box may request a new IP address from the DHCP server again, or request a continued use of the allocated IP address from the DHCP server. Through such a process, the set-top box may continuously receive the EPG information, or the firmware or CAS message, and perform an updating process.

Thus, when the set-top box is in the active standby state, a DHCP client function may be activated due to the activation of the background function, and thus an IP address may continuously change through the network connection. An IP connection to the headend may also be enabled, and thus messages transmitted from the headend may be immediately received and processed. Conversely, when the set-top box is in the passive standby state, the DHCP client function may be inactivated due to the inactivation of the background function, and thus operations for updating an IP address may not be performed and the connection for the IP address may not be maintained.

Thus, there is a desire for a method of providing a smooth broadcasting service and also effectively reducing an amount of standby power, although a passive standby state that is recommended for reducing the standby power is applied.

SUMMARY

An aspect provides a method of acquiring an Internet protocol (IP) address to maintain a network connection of a set-top box despite the set-top box being in a passive standby state by enabling the maintenance of the network connection that may not be maintained due to an inactivation of a background function when the set-top box is in the passive standby state.

According to an aspect, there is provided a method of acquiring an IP address of a set-top box performed by a power management server, the method including determining whether a state of the set-top box changes from a broadcasting state in which a broadcasting service is provided to a passive standby state in which a network connection between the set-top box and a headend providing the broadcasting service is blocked, receiving, from the set-top box, state information associated with an IP address allocated to the set-top box for the network connection in response to the state of the set-top box changing to the passive standby state, and transmitting, to the set-top box, a state change command to maintain the network connection for the IP address allocated to the set-top box based on the received state information.

The determining may include determining whether the state of the set-top box changes from an active standby state to the passive standby state after the state of the set-top box changes from the broadcasting state to the active standby state in which the broadcasting service is not provided and the network connection between the set-top box and the headend is available.

The state information associated with the IP address may include at least one of a time at which the set-top box enters the passive standby state, the IP address of the set-top box and a media access control (MAC) address of the set-top box, and a lease time for the IP address allocated to the set-top box.

The transmitting may include detecting a state maintenance time of routing information of the set-top box and transmitting, to the set-top box, the state change command based on the detected state maintenance time of the routing information and the state information.

The detecting may include detecting the state maintenance time of the routing information maintained in the set-top box when the state of the set-top box changes to the passive standby state.

The transmitting may include transmitting, to the set-top box, the state change command before the IP address allocated to the set-top box is retrieved by an IP management server based on the state maintenance time and the state information.

The set-top box may change the state of the set-top box from the passive standby state to an active standby state based on the state change command received from the power management server, and receive a reallocated IP address from the IP management server or extend use of the allocated IP address, and maintain the network connection.

The state change command may activate the set-top box to receive the reallocated IP address from the IP management server or extend the use of the allocated IP address by changing the state of the set-top box from the passive standby state to the active standby state.

According to another aspect, there is provided a method of acquiring an IP address performed by a set-top box, the method may include receiving an IP address allocated by an IP management server configured to manage the IP address of the set-top box for a network connection between the set-top box and a headend, when power is input to the set-top box, determining whether a state of the set-top box changes from a broadcasting state in which a broadcasting service is provided to a passive standby state in which the network connection is blocked, transmitting, to a power management server, state information associated with the IP address allocated to the set-top box when the state of the set-top box changes to the passive standby state, receiving, from the power management server, a state change command to maintain the network connection for the IP address allocated to the set-top box in response to the state information, and maintaining the network connection for the IP address by changing the state of the set-top box to an active standby state in which the network connection of the set-top box is available in response to the received state change command.

The power management server may transmit, to the set-top box, the state change command to receive a reallocated IP address from the IP management server or extend use of the allocated IP address before the IP address allocated to the set-top box is retrieved by the IP management server based on a lease time for the IP address included in the state information.

The maintaining may include changing the state of the set-top box from the passive standby state to the active standby state in response to the state change command, transmitting, to the IP management server, a usage message on use of the IP address in the active standby state before the lease time for the IP address allocated by the IP management server is terminated, and receiving a response message to the usage message on the use of the IP address from the IP management server, and maintaining the network connection for the IP address of the set-top box in response to the response message.

The usage message on the use of the IP address may include information about a request for extension of the use of the IP address allocated to the set-top box or information about a request for allocation of a new IP address. The response message may include at least one of information about a lease time for extended use of the IP address allocated to the set-top box and information about a lease time for use of the new IP address reallocated to the set-top box.

The method may further include changing the state of the set-top box from the active standby state to the passive standby state after the network connection for the IP address of the set-top box is acquired.

The set-top box may maintain the passive standby state or change the state of the set-top box from the passive standby state to the active standby state after the state of the set-top box changes to the passive standby state, based on whether the lease time for the IP address has elapsed and whether the state change command is received.

BRIEF DESCRIPTION OF THE DRAWINGS

These and/or other aspects, features, and advantages of the present disclosure will become apparent and more readily appreciated from the following description of embodiments, taken in conjunction with the accompanying drawings of which.

DETAILED DESCRIPTION

Reference will now be made in detail to embodiments of the present disclosure, examples of which are illustrated in the accompanying drawings, wherein like reference numerals refer to the like elements throughout. Example embodiments are described below to explain the present disclosure by referring to the figures.

Figure 1:
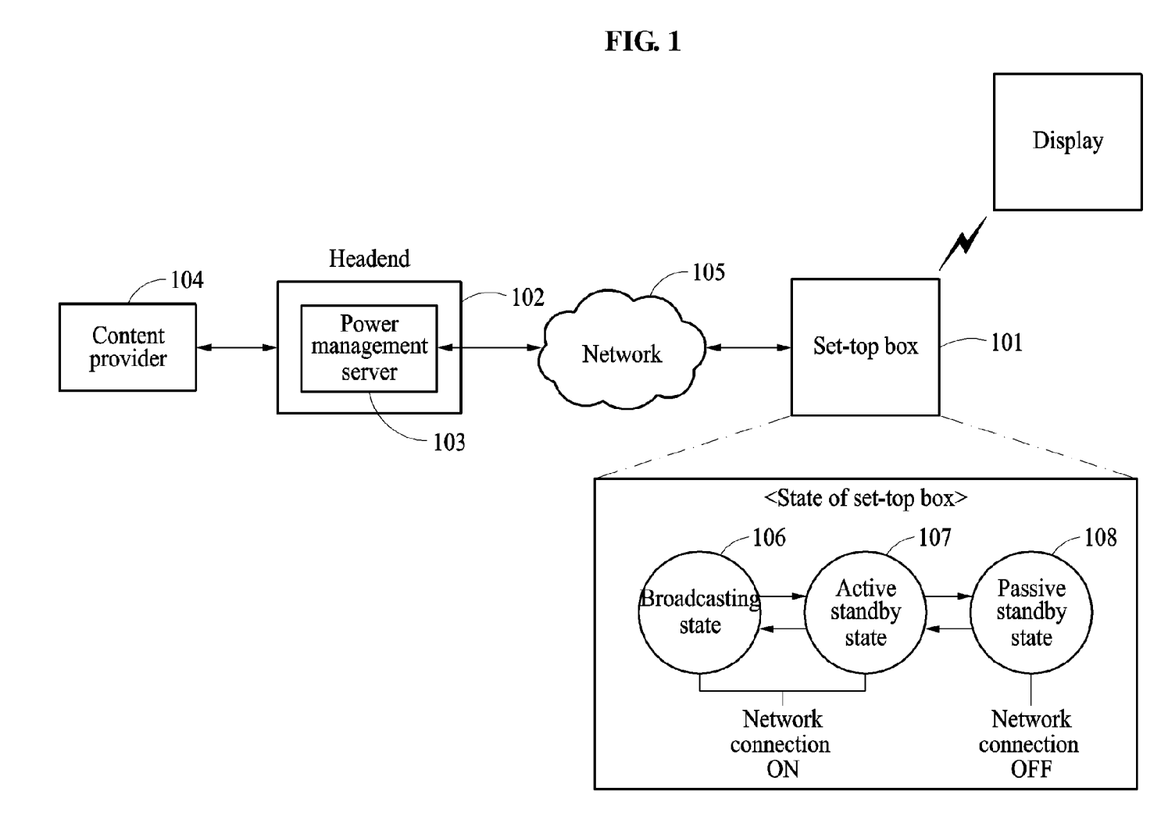
FIG. 1 is a diagram illustrating a configuration including a set-top box and a power management server according to an embodiment.

FIG. 1 is a diagram illustrating a configuration including a set-top box and a power management server according to an embodiment.

Referring to FIG. 1, a set-top box 101 may receive, from a headend 102, a broadcast content to be provided to a user.

The headend 102 may receive the broadcast content from a content provider 104, and transfer the received broadcast content to the set-top box 101. The set-top box 101 may provide a broadcasting service to the user based on the received broadcast content.

Here, to smoothly provide the broadcasting service to the user, the set-top box 101 may periodically receive, from the headend 102, a broadcasting information message associated with the broadcasting service. The broadcasting information message may include, for example, electronic program guide (EPG) information, a firmware or client access server (CAS) message transmitted from the headend 102 at predetermined intervals. The set-top box 101 may provide the user with a new broadcasting service that is recently added through the broadcasting information message received from the headend 102.

To this end, the set-top box 101 may be connected to the headend 102 through a network 105, which is a network connection between the set-top box 101 and the headend 102, and the set-top box 101 may receive the broadcasting information message using an Internet protocol (IP) address allocated to the set-top box 101. Here, the set-top box 101 may periodically receive an IP address allocated to the set-top box 101 from an IP management server, and receive the broadcasting information message from the headend 102 through the network connection using the allocated IP address.

The set-top box 101 may change and maintain a state of the set-top box 101 for the IP address. In detail, the state of the set-top box 101 may be classified into a broadcasting state 106 in which the broadcasting service received from the headend 102 is provided and a standby state in which the broadcasting service is not provided. The standby state may be classified into an active standby state 107 and a passive standby sate 108 based on power consumption for reducing an amount of standby power of the set-top box 101.

In the active standby state 107, the network connection to the headend 102 using the network 105 is allowable, and thus the set-top box 101 may receive the broadcasting information message from the headend 102 through the network connection, or an IP connection, to the headend 102 despite a change of the IP address allocated to the set-top box 101. Conversely, in the passive standby state 108, the network connection using the network 105 is not available, and thus the IP address allocated to the set-top box 101 may not be updated and the network connection to the headend 102 may not be possible.

Thus, the set-top box 101 may receive the broadcasting information message from the headend 102 in the broadcasting state 106 and the active standby state 107 in which the network connection is available. Conversely, the set-top box 101 may not receive the broadcasting information message from the headend 102 in the passive standby state 108 in which the network connection is not available. However, according to example embodiments of the present disclosure, a power management server 103 included in the headend 102 may be used to control the set-top box 101 being in the passive standby state 108 in which the broadcasting information message may not be received, in order for the set-top box 101 to receive the broadcasting information message from the headend 102.

That is, the power management server 103, which controls power of the set-top box 101 entering the passive standby state 108, may control the state of the set-top box 101. For example, when the state of the set-top box 101 changes from the broadcasting state 106 to the passive standby state 108, the power management server 103 may receive, from the set-top box 101, state information associated with the IP address allocated to the set-top box 101. The power management server 103 may then recognize that the set-top box 101 enters the passive standby state 108 based on the received state information. That is, the power management server 103 may receive the state information to monitor whether the network connection between the set-top box 101 and the headend 102 is unavailable due to the entry of the set-top box 101 into the passive standby state 108.

In addition, the power management server 103 may change the state of the set-top box 101 being in the passive standby state 108 to the active standby state 107, as necessary. That is, when the broadcasting information message needs to be received from the headend 102, the power management server 103 may verify a current state of the set-top box 101 and transmit a state change command to change the state of the set-top box 101 from the passive standby state 108 to the active standby state 107. The state change command may include a command to activate the set-top box 101 to receive a new IP address reallocated by the IP management server or extend use of the IP address already allocated to the set-top box 101 by changing the passive standby state 108 to the active standby state 107.

For example, when the broadcasting information message needs to be transferred to the set-top box 101 currently being in the passive standby state 108, the power management server 103 may transmit the state change command to change the current state of the set-top box 101 to a state in which the network connection is available.

In response to the state change command, the set-top box 101 may change the current state from the passive standby state 108 to the active standby state 107. In addition, the set-top box 101 may transmit, to the IP management server, a usage message on the use of the IP address before a lease time for the IP address allocated by the IP management server during the active standby state 107 is terminated. The set-top box 101 may receive, from the IP management server, a response message to the usage message, and maintain the network connection for the IP address of the set-top box 101 in response to the response message.

The usage message may include information about a request for extending the use of the IP address allocated to the set-top box 101 or information about a request for allocating the new IP address to the set-top box 101. The response message may include at least one of a lease time for the extended use of the IP address allocated to the set-top box 101 and the reallocated IP address, and a lease time for use of the reallocated IP address.

The set-top box 101 may change the state from the active standby state 107 to the passive standby state 108 after acquiring (or maintaining) the network connection for the IP address of the set-top box 101. In addition, the set-top box 101 may maintain the passive standby state 108 or change the state from the passive standby state 108 to the active standby state 107, based on whether the lease time for the IP address has elapsed or whether the state change command is received after the state of the set-top box 101 changes to the passive standby state 108.

The power management server 103 may provide a continued network or IP connection between the set-top box 101 and the headend 102 despite the set-top box 101 being in the passive standby state 108 by controlling the power of the set-top box 101 being in the passive standby state 108 in which updating the IP address is not available.

Thus, although the set-top box 101 enters the passive standby state 108 in which the set-top box 101 is connected to the headend 102 through the network 105, the power management server 103 may control, in real time, the set-top box 101 to be connected to the headend 102 through the network 105, and thus may provide the broadcasting service to the user and also effectively reduce an amount of standby power of the set-top box 101. The state of the set-top box 101 may be changeable between the active standby state 107 and the passive standby state 108 based on the state change command to reduce the power. To this end, the set-top box 101 may communicate with the power management server 103.

Figure 2:
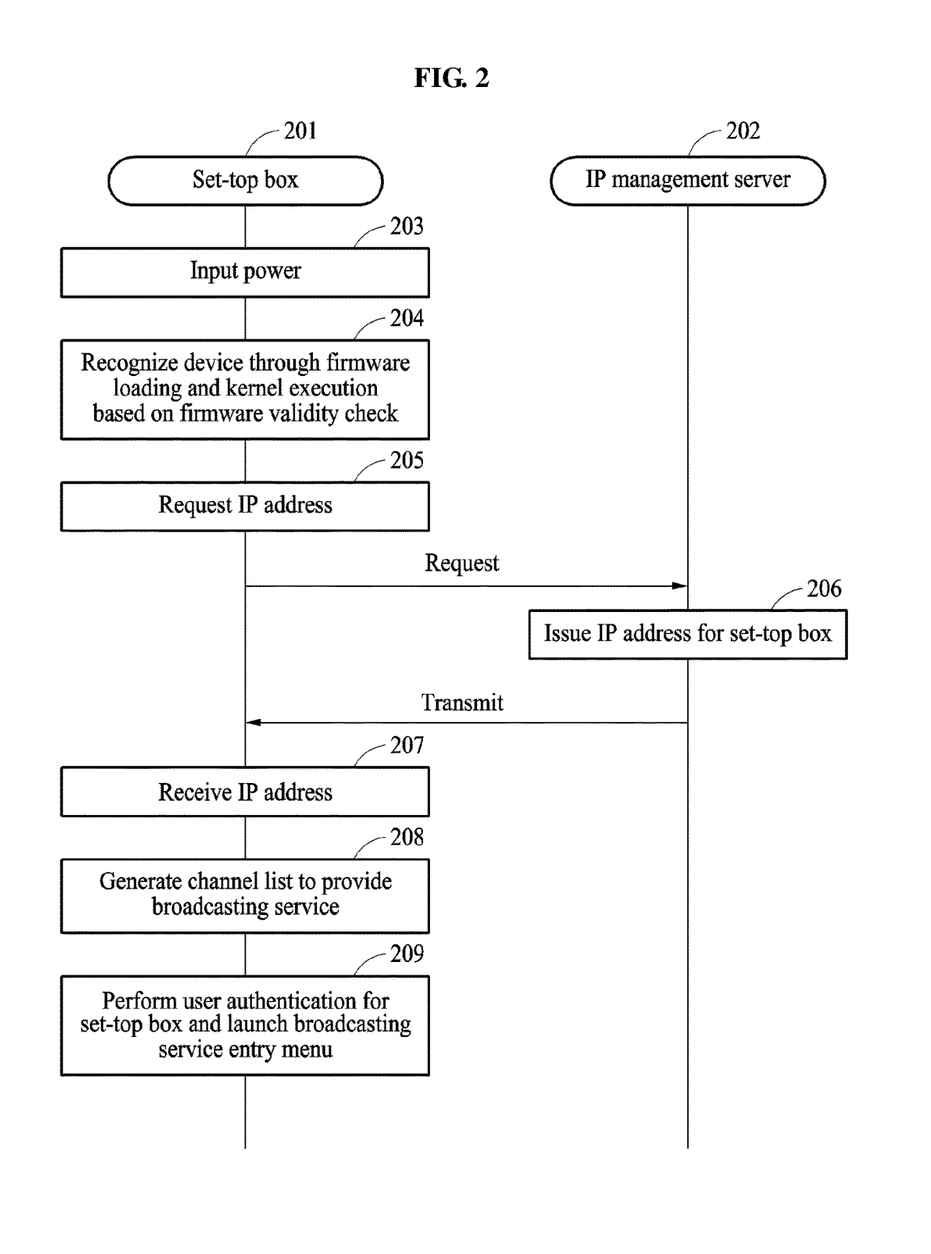
FIG. 2 is a flowchart illustrating a process of booting a set-top box according to an embodiment.

FIG. 2 is a flowchart illustrating a process of booting a set-top box according to an embodiment.

Referring to FIG. 2, a set-top box 201 may provide a broadcasting service to a user through the following operations.

In operation 203, the set-top box 201 is powered on.

In operation 204, after the set-top box 201 is powered on, the set-top box 201 verifies validity of a firmware stored in a flash and loads, on a random access memory (RAM) disk, the firmware on which the validity is verified. The set-top box 201 recognizes various components and devices by executing a Linux kernel. The devices may include, for example, a network interface controller (NIC), an audio/visual (AV) driver, a demultiplexer (Demux), a descrambler, and a filesystem.

In operation 205, the set-top box 201 dynamically requests an IP management server 202 for an IP address using a dynamic host configuration protocol (DHCP) client software (SW), which is one of application programs at an application level that operates at an upper level of the Linux kernel.

In operation 206, the IP management server 202 issues the IP address among currently managed IP addresses for the set-top box 201 in response to the request for the IP address received from the set-top box 201. The IP management server 202 transmits the issued IP address to the set-top box 201. Here, the IP management server 202 may indicate a DHCP server that allocates the IP address to the set-top box 201 based on the request for the IP address by the set-top box 201 and responds to a lease time for use of the allocated IP address.

In operation 207, the set-top box 201 receives the IP address allocated by the IP management server 202.

In operation 208, the set-top box 201 generates a channel list of channels exposed to the user to provide the broadcasting service to the user. In detail, the set-top box 201 executes a Linux-based application program to operate an automated content access protocol (ACAP) middleware and a client access server (CAS) client module. In addition, the set-top box 201 generates the channel lists of the channels exposed to the user by receiving and parsing service information (SI) and classifying an AV channel, a data channel, and an interworking channel.

In operation 209, the set-top box 201 performs user authentication and launches broadcasting service menu.

In detail, the set-top box 201 performs the user authentication using CAS right control information. After the series of the operations described in the foregoing are successfully completed, the set-top box 201 completes preparation for actually providing the broadcasting service to the user by loading a permanent application required to be permanently loaded irrespective of a broadcasting channel.

Subsequently, during the broadcasting service being provided to the user, the set-top box 201 periodically receives, from a headend corresponding to a broadcasting center, a broadcasting information message, for example, the SI, authentication right information, and an application that are required for viewing a broadcast.

Here, for example, when the set-top box 201 is powered off by the user, the set-top box 201 may enter an active standby state. As described above, in the active standby state, a main function of the set-top box 201 for visual and audio output may be inactivated, and a background function may be activated. That is, in the active standby state, the set-top box 201 may maintain an IP connection to the headend through a network. Thus, when the user desires to view the broadcast again, the set-top box 201 being in the active standby state may have a relatively short booting time, and may receive a most recent broadcasting service through the IP connection by continuously receiving the SI presenting electronic program guide (EPG) information, and the CAS right information.

However, when an external input is not received for a predetermined period of time after the state of the set-top box 201 changes to the active standby state, the set-top box 201 may enter a passive standby state. That is, when the set-top box 201 is in the active standby state, a high amount of standby power may be consumed by the operating background function. Thus, when a predetermined period of time elapses, the set-top box 201 may enter the passive standby state to reduce the standby power more effectively than being in the active standby state.

Here, the set-top box 201 may have a function of remotely managing power. Using such a function, although the set-top box 201 enters the passive standby state, the set-top box 201 may change the state of the set-top box 201 from the passive standby state to the active standby state through a power management server, and receive the most recent broadcasting service through the IP connection.

Figure 3:
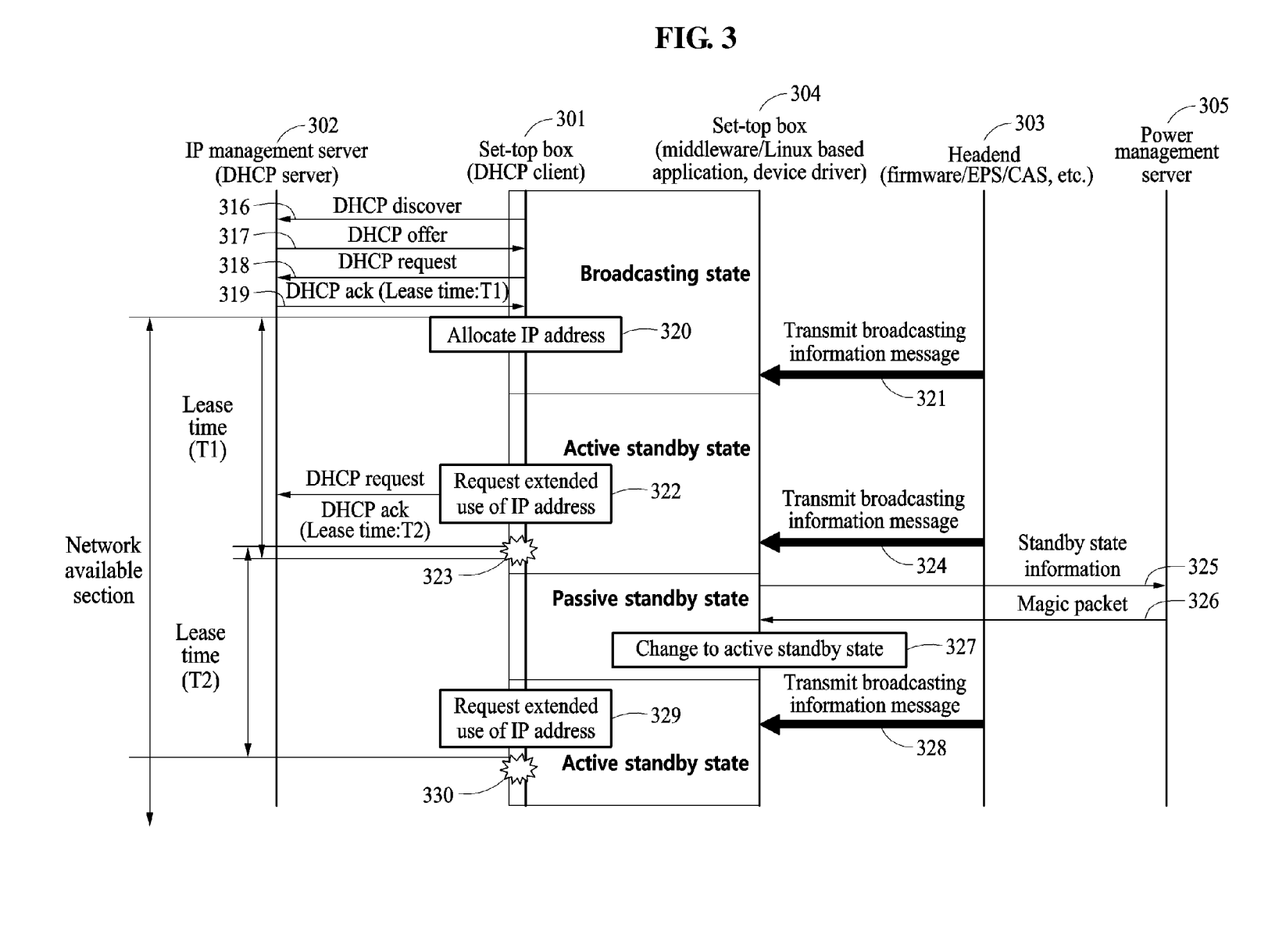
FIG. 3 is a diagram illustrating a flow of a process of maintaining an Internet protocol (IP) address of a set-top box being in a passive standby state according to an embodiment.

FIG. 3 is a diagram illustrating a flow of a process of maintaining an IP address of a set-top box being in a passive standby state according to an embodiment.

Referring to FIG. 3, in operation 316, a set-top box 301 transmits a "DHCP discover" message through a network to receive an IP address allocated by an IP management server 302. The set-top box 301 transmits the DHCP discover message to all nodes in the network to verify an IP server address of the network for a network connection.

In operation 317, the IP management server 302 receives the DHCP discover message from the set-top box 301. In response to the received DHCP discover message, the IP management server 302 transmits a "DHCP offer" message to the set-top box 301. The DHCP offer message may include, for example, an IP address of the IP management server 302, an IP address allocable to the set-top box 301, and a lease time for the allocable IP address.

In operation 318, the set-top box 301 receives the DHCP offer message from the IP management server 302, and transmits a "DHCP request" message to use the IP address allocated by the IP management server 302 based on the DHCP offer message.

In operation 319, the IP management server 302 receives the DHCP request message from the set-top box 301, and transmits a "DHCP ack" message to the set-top box 301. The IP management server 302 finally determines an IP address to be used in the set-top box 301 and the lease time for the IP address through the DHCP ack message.

In operation 320, the set-top box 301 receives the finally determined IP address and the lease time, for example, T1. Through operations 316 through 320 described in the foregoing, a state of the set-top box 301 may be defined as a broadcasting state in which a user views a broadcast.

In operation 321, a set-top box 304 being in the broadcasting state receives a broadcasting information message of, for example, EPG information, a firmware, and a CAS, from a headend 303. Subsequently, the state of the set-top box 301 may change to an OFF state through a power button of a remote controller, and thus the state of the set-top box 301 may change from the broadcasting state to an active standby state. The set-top box 301 may then maintain the active standby state for a predetermined period of time.

In operation 322, the set-top box 301 being in the active standby state transmits, to the IP management server 302 (for example, a DHCP server), a request that the set-top box 301 being in the active standby state is connected to the headend 303 through a network and maintain such a network connection before a retrieval time of the IP address. That is, similarly to operation 318, the set-top box 301 may transmit, to the DHCP server, a message in a unicast form using a "DHCP request" message to verify whether a currently allocated IP address is maintained.

In operation 323, the set-top box 301 receives a "DHCP ack" message from the IP management server 302 in response to the DHCP request message, and continuously maintains the allocated IP address in response to the DHCP ack message. That is, the set-top box 301 obtains a reusable IP address and a lease time T2 for the reusable IP address through the DHCP ack message. Here, when the IP management server 302 allocates a new IP address in lieu of the IP address previously allocated to the set-top box 301, the set-top box 301 may receive an IP address of the DHCP server, the new IP address allocated to the set-top box 301, for example, an IP set-top box, a lease time for the new IP address through a DHCP offer message. When a predetermined period of time elapses, the state of the set-top box 301 may change from the active standby state to a passive standby state.

In operation 324, the set-top box 304 is able to be connected to the headend 303 through the network using the IP address despite the set-top box 304 being in the passive standby state, because the set-top box 304 obtains the IP address and the lease time T2 for the IP address although the set-top box 304 enters the passive standby state. Thus, the set-top box 304 may receive the broadcasting information message from the headend 303 through the connected network.

In operation 325, in response to the change in the state to the passive standby state, the set-top box 301 transmits, to a power management server 305, state information associated with the IP address allocated to the set-top box 301. The state information may include a point in time at which the active standby state is terminated and the state changes to the passive standby state, a retrieval time of the IP address, an IP address currently allocated to the set-top box 301, and a media access control (MAC) address of the set-top box 301.

Here, the set-to box 301 transmits the state information to the power management server 305 because, when a system included in the headend 303, for example, an EPG, CAS, and middleware based data broadcasting application, needs to transmit data to the set-top box 304 depending on a situation, the set-top box 304 being in the passive standby state may not process the data. That is, when the set-top box 304 is in the passive standby state, the set-top box 304 may need to return to the active standby state before EPG presenting or firmware updating is performed and the power management server 305 may need to be aware of the state of the set-top box 304.

In operation 326, the power management server 305 transmits a state change command to change the passive standby state to the active standby state of the set-top box 304.

In operation 327, the set-top box 304 enters the active standby state from the passive standby state.

In operation 328, the set-top box 304 receives the broadcasting information message, for example, EPG information, firmware, and CAS, from the headend 303, and updates the state of the set-top box 304 to be a most recent state based on the received broadcasting information message.

In operation 329, the set-top box 301 transmits, to the IP management server 302 a request that the set-top box 301 maintains the network connection before a retrieval time of the reallocated IP address.

Figure 4:
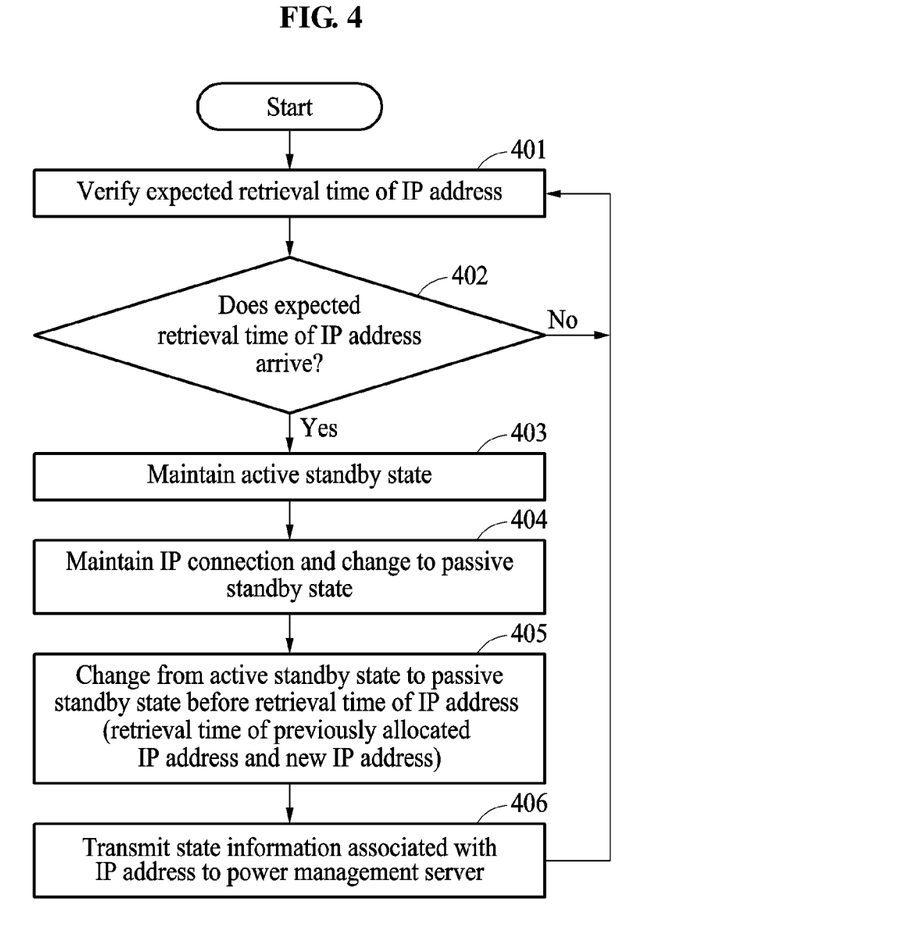
FIG. 4 is a flowchart illustrating a process of allocating an IP address to a set-top box and a structure of a state change command according to an embodiment.

FIG. 4 is a flowchart illustrating a process of allocating an IP address to a set-top box and a structure of a state change command according to an embodiment.

Referring to FIG. 4, in operation 401, a set-top box verifies, in real time, an expected retrieval time of an IP address allocated to the set-top box. The expected retrieval time of the IP address indicates a time set based on a lease time received from an IP management server when the IP address is finally allocated to the set-top box by the IP management server. The set time may be recorded in a register in the set-top box.

In operation 402, the set-top box verifies whether the expected retrieval time of the IP address arrives based on the lease time received from the IP management server. When the expected retrieval time does not arrive, the set-top box may verify again an expected retrieval time of the IP address allocated to the set-top box.

In operation 403, when the expected retrieval time arrives, the set-top box maintains a current state of the set-top box to be an active standby state in which a network connection to a headend is available. That is, when the retrieval time of the IP address arrives based on a time recorded as the lease time, the set-top box may maintain a standby state of the set-top box to be the active standby state.

In operation 404, the set-top box performs a protocol operation similar to operation 318 described with reference to FIG. 3 to update the allocated IP address. That is, the set-top box may provide, to the IP management server, a notification that the set-top box continuously maintains the network connection before the retrieval time for the IP address. The set-top box may receive, from the IP management server, a reusable IP address and a lease time for the reusable IP address or a new IP address and a lease time for the new IP address, and thus may maintain the network connection.

In operation 405, the set-top box records, in a register, the lease time re-received in operation 404 and enters a passive standby state from the active standby state.

In operation 406, the set-top box transmits, to a power management server, a time at which the set-top box enters the passive standby state, the IP address of the set-top box and a MAC address of the set-top box, and state information associated with a retrieval time of a next IP address, in a form of an IP packet.

The power management server may receive the state information from the set-top box, and manage a time for an entry into the passive standby state for each IP address of the set-top box or a time for a change to the active standby state to maintain the network connection state for the IP address based on the received state information.

As described above, the state of the set-top box may need to change to the active standby state so that the set-top box may process a data packet to be transmitted from various data transmission systems included in the headend, for example, an EPG, firmware, and middleware based application, and a CAS right control message.

Thus, the set-top box may receive a state change command, for example, "magic packet," transmitted from the power management server to change the state of the set-top box to the active standby state. Here, the power management server may generate and transmit the state change command before the IP address of the set-top box is retrieved by the IP management server.

When the set-top box does not receive the state change command before the retrieval time for the IP address, the set-top box may continuously maintain the passive standby state. In addition, when the retrieval time for the IP address has elapsed or the state change command is not received at the retrieval time, the set-top box being in the passive standby state may change the state to the active standby state itself.

Figure 5:
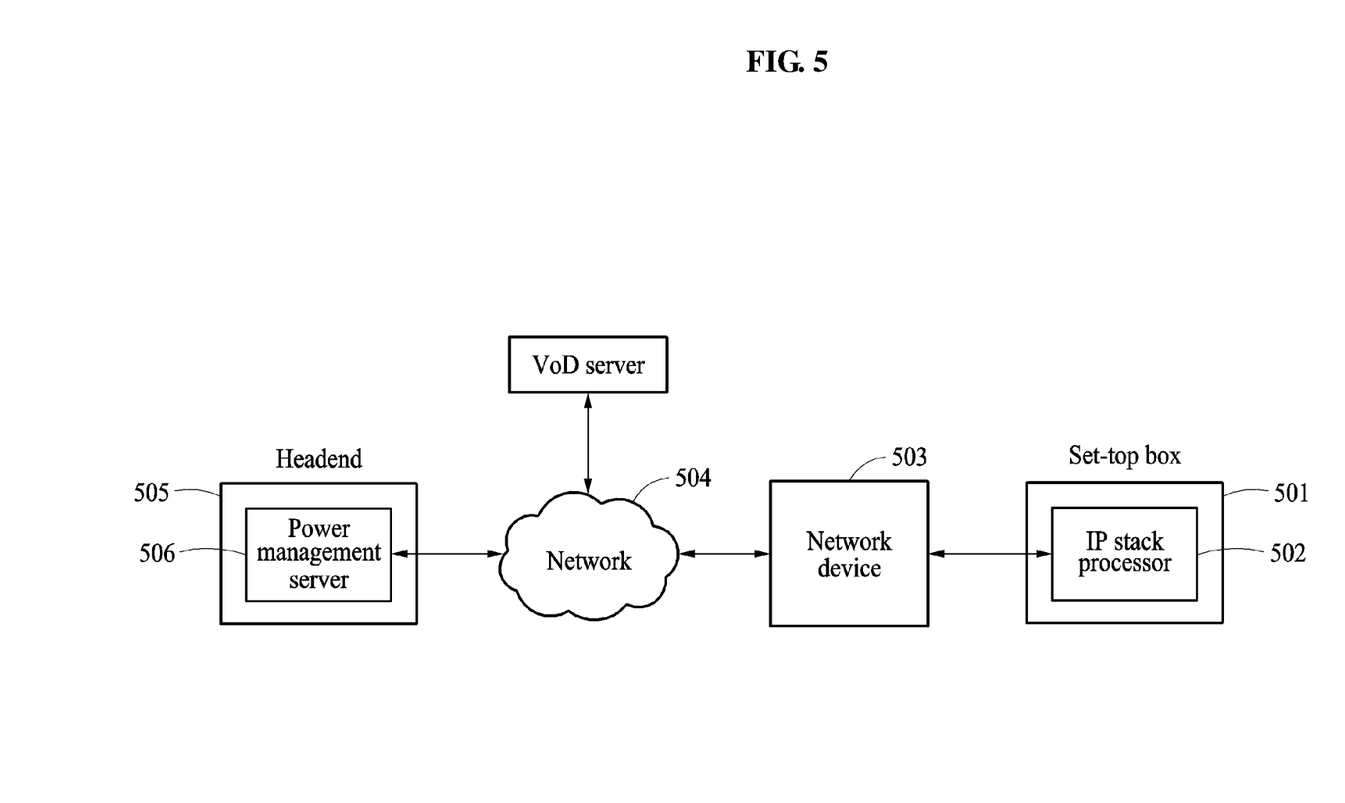
FIG. 5 is a diagram illustrating a network device interworking with a set-top box according to an embodiment.

FIG. 5 is a diagram illustrating a network device interworking with a set-top box according to an embodiment.

Referring to FIG. 5, a set-top box 501 may receive an IP address allocated to the set-top box 501 from an IP management server. The IP address allocated to the set-top box 501 may be set to be used for only a predetermined period of time by the IP management server, and thus the set-top box 501 may request the IP management server to continuously use the IP address to maintain the IP address.

That is, when the set-top box 501 is in an active standby state, a background function may be activated and a DHCP client application program of a user mode upper than a kernel mode may operate, and thus the set-top box 501 may request the IP management server for use of the IP address based on a lease time for the IP address. However, when the set-top box 501 is in a passive standby state, the background function may be inactivated and the IP address allocated to the set-top box 501 may be retrieved, and thus a network connection of the set-top box 501 may be blocked.

Thus, a power management server 506 may manage routing information maintained in a network device 503 connected to the set-top box 501, and may prevent the network connection of the set-top box 501 being in the passive standby state from being blocked. In detail, the network device 503 may be connected to the set-top box 501, and a local area network (LAN) of the set-top box 501 may be inactivated when the set-top box 501 enters the passive standby state. The network device 503 may discard the routing information of the set-top box 501 that is maintained in the network device 503, for example, an IP address and a MAC address, when a predetermined period of time elapses after the LAN of the set-top box 503 is inactivated.

For example, the network device 503 may discard the routing information of the set-top box 501 that is maintained in the network device 503, for example, an IP address and a MAC address, when the predetermined period of time, for example, five minutes, elapses after the set-top box 501 enters the passive standby state and a LAN controller is inactivated.

Thus, when the set-top box 501 enters the passive standby sate, the power management server 506 may receive, from the set-top box 501, state information including a time at which the set-top box 501 enters the passive standby state, the IP address and the MAC address of the set-top box 501, and the lease time for the IP address allocated to the set-top box 501.

In response to the inactivation of the LAN controller based on the state information, the power management server 506 may verify a maintenance time during which the network device 503 maintains the routing information and extend the verified maintenance time for the routing information based on the state information. That is, the power management server 506 may periodically extend the maintenance time for maintaining the routing information, for example, a lifespan of the routing information, and thus may prevent the routing information maintained in the network device 503 from being discarded.

Figure 6:
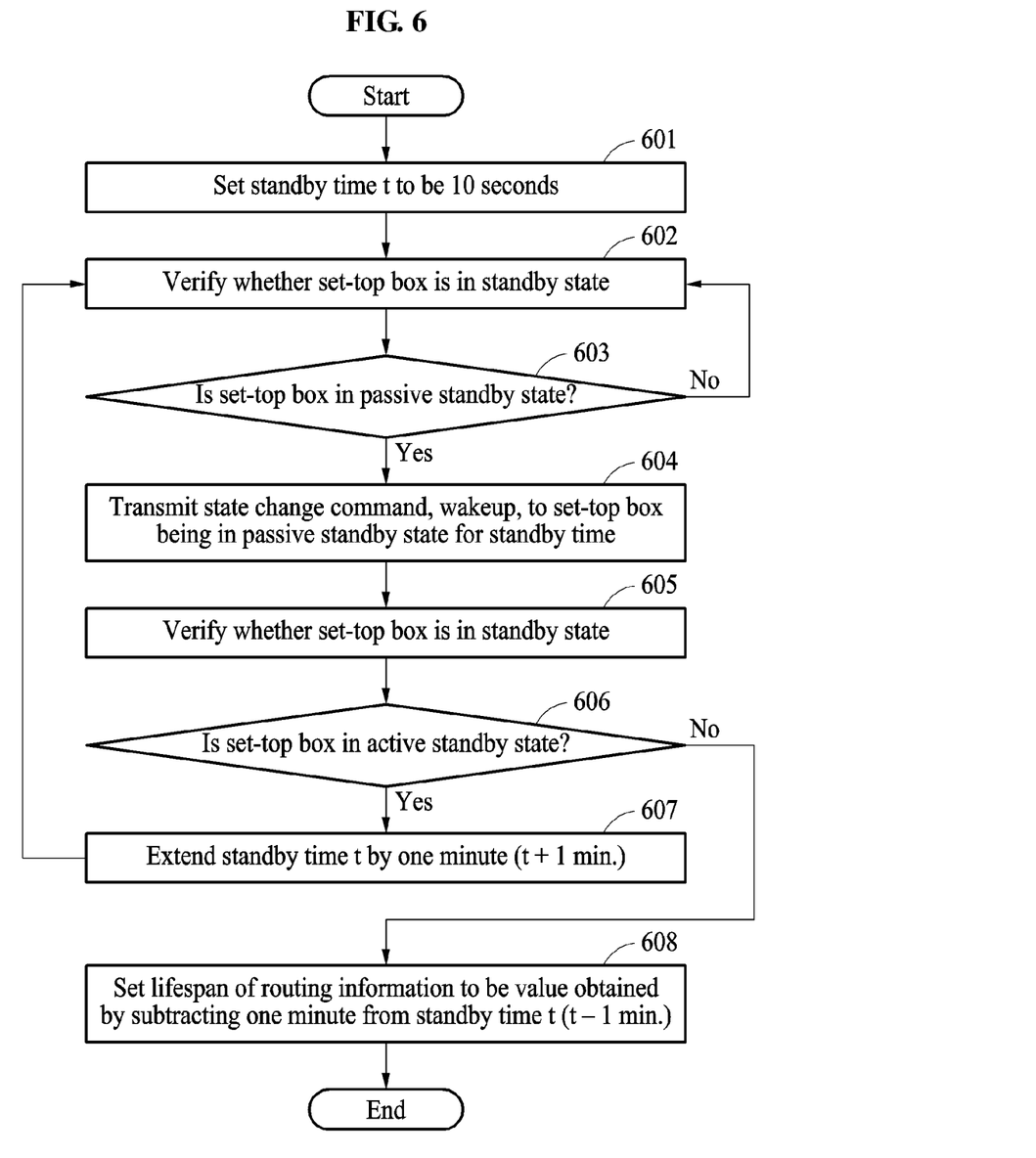
FIG. 6 is a flowchart illustrating a process of detecting a lifespan of routing information of a network device according to an embodiment.

FIG. 6 is a flowchart illustrating a process of detecting a lifespan of routing information of a network device according to an embodiment.

A power management server may detect a maintenance time for routing information of a network device by interworking with a set-top box.

Referring to FIG. 6, in operation 601, the power management server initializes a standby time of the set-top box to be a minimum time for which the set-top box may be more effective in staying a passive standby state. The standby time may indicate a time that may facilitate a reduction in a power consumption of the set-top box. The power management server may set, for example, 10 seconds, to be the standby time to estimate the maintenance time for the routing information.

In operation 602, the power management server verifies whether the set-top box is in a standby state. The power management server may verify whether the set-top box is in an active standby state or the passive standby state.

In operation 603, the power management server determines whether the set-top box is in the passive standby state. When the set-top box is not in the passive standby state, but in the active standby state, the power management server may return to operation 602 and re-verify whether the set-top box is in the standby state.

In operation 604, when the set-top box is in the passive standby state, the power management server may transmit a state change command to the set-top box being in the passive standby state based on the standby time. That is, the power management server may transmit the state change command to the set-top box based on the standby time after the power manage server waits for a predetermined period of time.

In operation 605, the power management server verifies whether the set-top box is in the standby state.

In operation 606, the power management server determines whether the set-top box is in the active standby state. That is, the power management server may determine whether a state of the set-top box to which the state change command is transmitted based on the standby time changes to the active standby state. In operation 608, when the set-top box is not in the active standby state, the power management server sets a lifespan of the routing information to be a value obtained by subtracting one minute from the standby time (t−1 min.). That is, the power management server may consider a currently used standby time to be a maximum maintenance time for the routing information of the network device when the state change command fails.

In operation 607, when the set-top box is in the active standby state, the power management server extends the standby time by one minute to set a new standby time (t+1 min.). That is, the power management server may verify whether the set-top box normally enters the active standby state in response to the state change command, and the set-top box may verify whether the standby time is within the lifespan of the routing information. The power management server may repetitively verify whether the state change command operates in response to the extended standby time by inducing the set-top box to be in the passive standby state, after extending the standby time. Here, the power management server may repetitively perform, in seconds, the operations described in the foregoing for more accurate detection.

When the maintenance time for the routing information is detected to be less than or equal to the standby time, the power management server may not reduce a power consumption of the set-top box because a state transition occurs frequently in the set-top box.

As described above, the power management server may detect an effective maintenance time for the routing information of the network device, and change the state of the set-top box from the passive standby state to the active standby state in accordance with a period based on the maintenance time. When the state of the set-top box changes to the active standby sate, the set-top box may extend the maintenance time for the routing information of the network device. In detail, the set-top box may extend the maintenance time for the routing information using an IP stack processor, and transmit a packet, for example, the state information about the standby state to the power management server.

When the extending of the routing information is completed by the set-top box, the power management server may change the state of the set-top box to the passive standby state. That is, the power management server may unconstrainedly change the state of the set-top box from the passive standby state to the active standby state, as necessary, based on the routing information.

Figure 7:
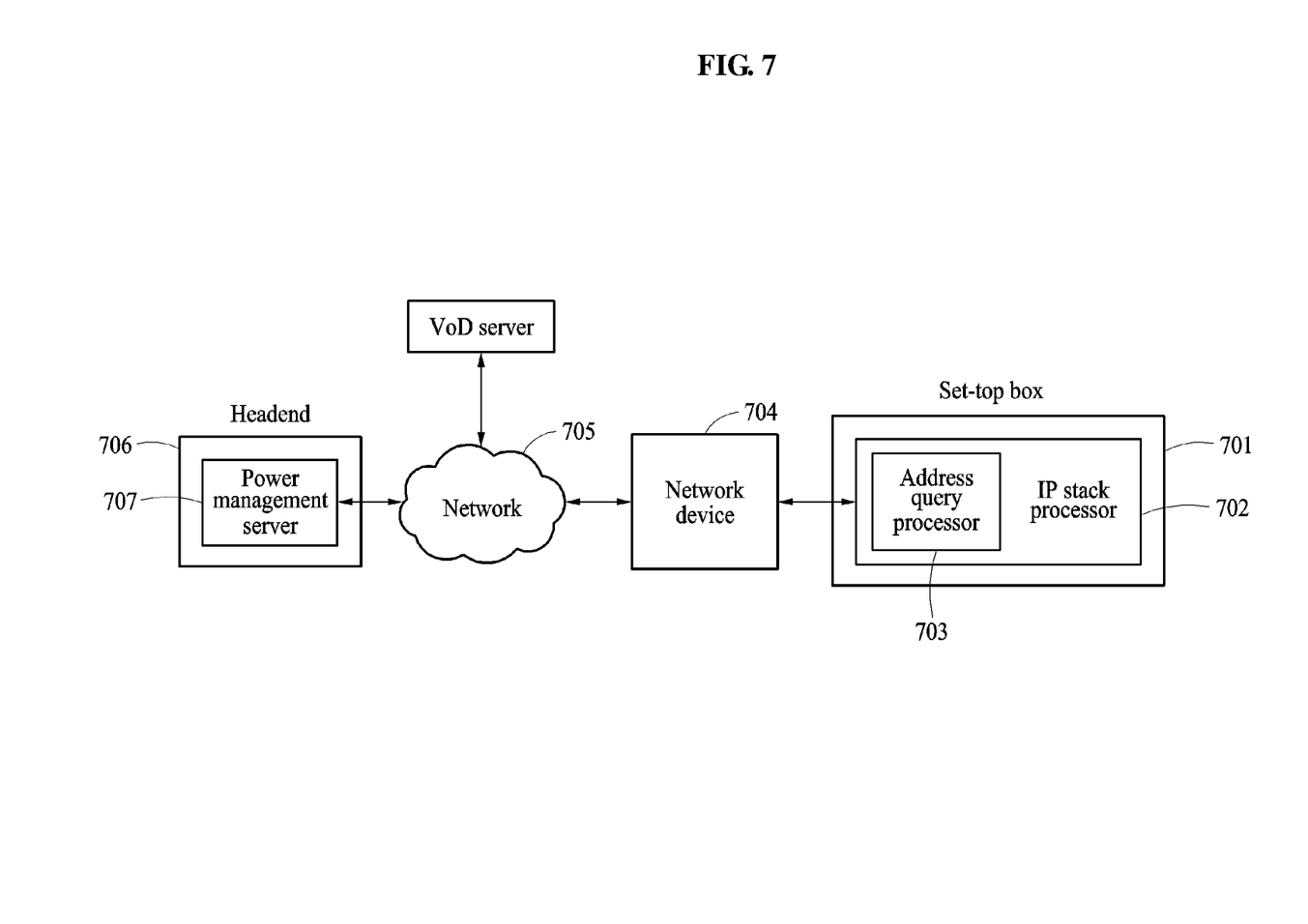
FIG. 7 is a diagram illustrating a configuration applied to maintain routing information of a set-top box by a network device according to an embodiment.

FIG. 7 is a diagram illustrating a configuration applied to maintain routing information of a set-top box by a network device according to an embodiment.

A power management server may periodically change a state of a set-top box based on a maintenance time for routing information in a network device although the set-top box includes a separate a micro controller unit (MCU).

Referring to FIG. 7, although routing information is discarded from a network device 704 because a maintenance time for the routing information is exceeded, a power management server 707 of a headend 706 may transmit a state change command through a separate MCU. That is, when a predetermined period of time elapses after a set-top box 701 enters a passive standby state, the network device 704 may discard the routing information associated with the set-top box 701.

The power management server 707 may then transmit the state change command to the set-top box 701 through a network 705 irrespective of the routing information in the network device 704. The state change command may be transmitted to the network device 704 corresponding to an IP address of the set-top box 701. Here, since the network device 704 does not include the IP address of the set-top box 701 in the routing information currently maintained in the network device 704, the network device 704 may broadcast the IP address of the set-top box 701 through a subnet of the network device 704. That is, the network device 704 may broadcast the IP address of the set-top box 701, and verify whether the set-top box 701 connected through the IP address is present.

Here, the set-top box 701 may maintain a LAN to be in an activated state using an address query processor 703 included in an IP stack processor 702. The address query processor 703 may operate in the separate MCU of the set-top box 701, and maintain the LAN to be in the activated state irrespective of the network device 704.

In addition, when an address query with respect to the IP address of the set-top box 701 broadcasted by the network device 704 arrives, the address query processor 703 may determine whether an IP address included in the address query is identical to an IP address of the address query processor 703. When the IP address in the address query is identical to the IP address of the address query processor 703, the address query processor 703 may transfer the IP address and a MAC address to the network device 704, and inactivate the currently activated LAN.

Subsequently, the network device 704 may verify the MAC address of the set-top box 701 by receiving a response from the address query processor 703, and transfer the state change command received from the power management server 707 to a port connected to the set-top box 701. When the state change command is transferred through the port, a LAN controller may recognize the transferred state change command and change the state of the set-top box 701 to the active standby state.

Figure 8:
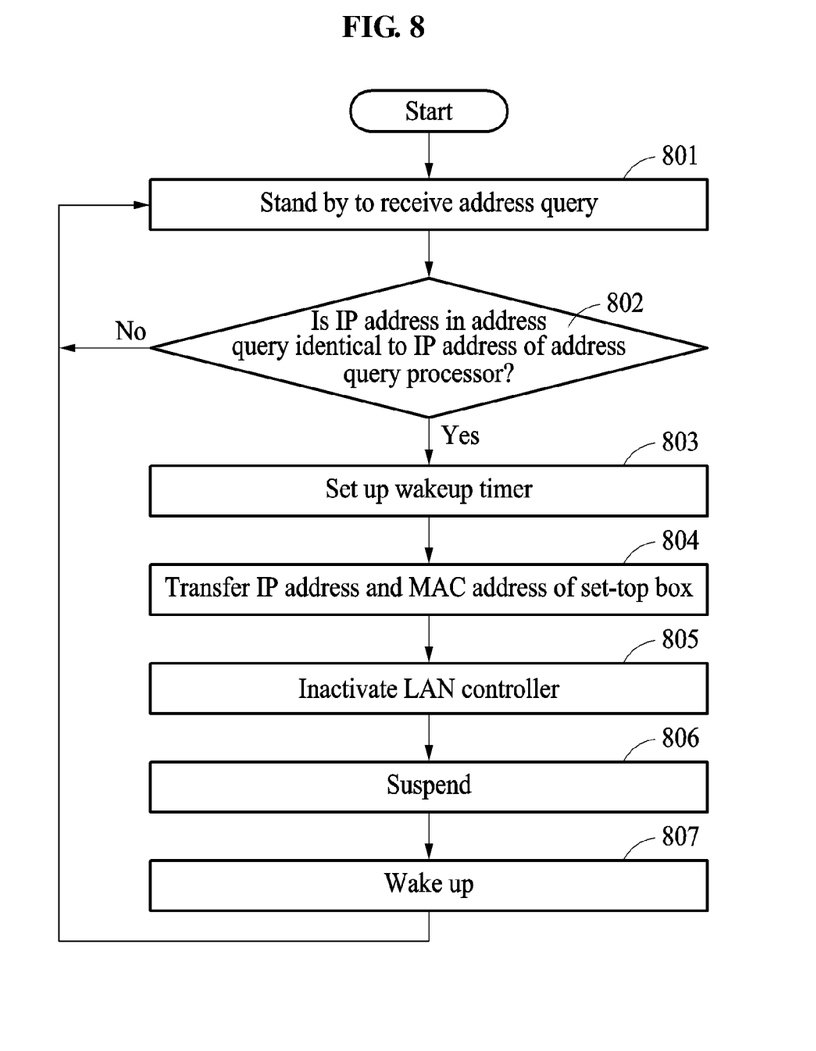
FIG. 8 is a flowchart illustrating a process of processing a query about routing information of a set-top box according to an embodiment.

FIG. 8 is a flowchart illustrating a process of processing a query about routing information of a set-top box according to an embodiment.

Referring to FIG. 8, in operation 801, an address query processor stands by to receive an address query to be transmitted from a subnet of a network device. The address query processor may receive the address query generated from the subnet of the network device.

In operation 802, the address query processor determines whether an IP address included in the address query received from the subnet of the network device is identical to an IP address of the address query processor. When the IP address in the address query is not identical to the IP address of the address query processor, the address query processor may stand by to receive a new address query.

In operation 803, when the IP address in the address query is identical to the IP address of the address query processor, the address query processor prepares for a state transition of a set-top box. The address query processor sets up a wakeup timer. That is, the address query processor may reserve a time for activating the set-top box using a separate timer. The reserved time may indicate a time to be set in preparation for a case in which a state change command does not arrive after the address query.

In operation 804, the address query processor transfers the IP address and a MAC address to the network device.

In operation 805, the address query processor changes, to an inactivated state, a state of a LAN controller maintained irrespective of the network device. It is because a LAN setting needs to be performed with the network device when the IP address and the MAC address are transferred to the network device.

In operation 806, the address query processor suspends the state of the set-top box. The suspended state may indicate a state maintained until the state change command is received from the network device. When the state change command normally arrives from the network device, the address query processor may change the state of the set-top box from the passive standby state to the active standby state in response to the state change command.

In operation 807, when the state of the set-top box changes from the passive standby state to the active standby state, the address query processor does not perform an operation on the wakeup timer set up in operation 803.

According to example embodiments, an IP address acquiring method may effectively reduce power by detecting a change in a state of a set-top box to a passive standby state by a headend connected to the set-top box through a network, continuously maintaining an IP address available for the set-top box being in the passive standby state, and readily controlling standby power of the set-top box through the network connection.

The above-described example embodiments of the present disclosure may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tapes; optical media such as CD ROMs and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present disclosure, or vice versa.

Although a few example embodiments of the present disclosure have been shown and described, the present disclosure is not limited to the described embodiments. Instead, it would be appreciated by one of ordinary skill in the art that changes may be made to these embodiments without departing from the principles and spirit of the disclosure.

Therefore, the scope of the disclosure is defined not by the described example embodiments, but by the claims and their equivalents, and all variations within the scope of the claims and their equivalents are to be construed as being included in the disclosure.

What is claimed is:

1. A method of acquiring an Internet protocol (IP) address of a set-top box performed by a power management server, the method comprising:
    determining whether a state of a set-top box changes from a broadcasting state in which a broadcasting service is provided to a passive standby state in which a network connection between the set-top box and a headend providing the broadcasting service is blocked;
    receiving, from the set-top box, state information associated with an IP address allocated to the set-top box for the network connection in response to the state of the set-top box changing to the passive standby state;
    reducing a power consumption of the set-top box in response to the state of the set-top box changing to the passive standby state;
    transmitting, to the set-top box, a state change command to maintain the network connection for the IP address allocated to the set-top box based on the received state information;
    transmitting, through a separate microcontroller processor of the set-top box, a state change command in response to a state maintenance time of routing information of the set-top box being exceeded; and
    broadcasting a video content to the set-top box.

2. The method of claim 1, wherein the determining comprises:
    determining whether the state of the set-top box changes from an active standby state to the passive standby state after the state of the set-top box changes from the broadcasting state to the active standby state in which the broadcasting service is not provided and the network connection between the set-top box and the headend is available.

3. The method of claim 1, wherein the state information associated with the IP address comprises at least one of a time at which the set-top box enters the passive standby state, the IP address of the set-top box and a media access control (MAC) address of the set-top box, and a lease time for the IP address allocated to the set-top box.

4. The method of claim 1, wherein the transmitting comprises:
    detecting the state maintenance time of routing information of the set-top box; and
    transmitting, to the set-top box, the state change command based on the detected state maintenance time of the routing information and the state information.

5. The method of claim 4, wherein the detecting comprises:
    detecting the state maintenance time of the routing information maintained in the set-top box when the state of the set-top box changes to the passive standby state.

6. The method of claim 4, wherein the transmitting comprises:
    transmitting, to the set-top box, the state change command before the IP address allocated to the set-top box is retrieved by an IP management server based on the state maintenance time and the state information.

7. The method of claim 1, wherein the set-top box is configured to change the state of the set-top box from the passive standby state to an active standby state based on the state change command received from the power management server, and receive a reallocated IP address from the IP management server or extend use of the allocated IP address, and maintain the network connection.

8. The method of claim 1, wherein the state change command is configured to activate the set-top box to receive a reallocated IP address from an IP management server or extend use of the allocated IP address by changing the state of the set-top box from the passive standby state to an active standby state.

9. A method of acquiring an Internet protocol (IP) address performed by a set-top box, the method comprising:
    receiving an IP address allocated by an IP management server configured to manage the IP address of the set-top box for a network connection between the set-top box and a headend when power is input to the set-top box;
    determining whether a state of the set-top box changes from a broadcasting state in which a broadcasting service is provided to a passive standby state in which the network connection is blocked;
    transmitting, to a power management server, state information associated with the IP address allocated to the set-top box when the state of the set-top box changes to the passive standby state;
    reducing a power consumption of the set-top box in response to the state of the set-top box changing to the passive standby state;
    receiving, from the power management server, a state change command to maintain the network connection for the IP address allocated to the set-top box in response to the state information;
    maintaining the network connection for the IP address by changing the state of the set-top box to an active standby state in which the network connection of the set-top box is available in response to the received state change command;

receiving, at a separate microcontroller processor of the set-top box, a state change command in response to a state maintenance time of routing information of the set-top box being exceeded; and receiving broadcast video content at the set-top box.

10. The method of claim 9, wherein the power management server is configured to transmit, to the set-top box, the state change command to receive a reallocated IP address from the IP management server or extend use of the allocated IP address before the IP address allocated to the set-top box is retrieved by the IP management server based on a lease time for the IP address included in the state information.

11. The method of claim 9, wherein the maintaining comprises:
changing the state of the set-top box from the passive standby state to the active standby state in response to the state change command;
transmitting, to the IP management server, a usage message on use of the IP address in the active standby state before the lease time for the IP address allocated by the IP management server is terminated; and
receiving a response message to the usage message on the use of the IP address from the IP management server, and maintaining the network connection for the IP address of the set-top box in response to the response message.

12. The method of claim 11, wherein the usage message on the use of the IP address includes information about a request for extension of the use of the IP address allocated to the set-top box or information about a request for allocation of a new IP address, and the response message includes at least one of information about a lease time for extended use of the IP address allocated to the set-top box and information about a lease time for use of the new IP address reallocated to the set-top box.

13. The method of claim 9, further comprising:
changing the state of the set-top box from the active standby state to the passive standby state after the network connection for the IP address of the set-top box is acquired.

14. The method of claim 9, wherein the set-top box is configured to maintain the passive standby state or change the state of the set-top box from the passive standby state to the active standby state after the state of the set-top box changes to the passive standby state, based on whether the lease time for the IP address has elapsed and whether the state change command is received.

15. The method of claim 1, wherein, in response to the state maintenance time of the routing information of the set-top box being exceeded, the routing information of the set-top box is discarded, the routing information comprising the IP address and a MAC address.

16. The method of claim 1, further comprising extending the state maintenance time based on the state information using an IP stack processor.

17. The method of claim 1, further comprising not reducing a power consumption of the set-top box in response to the maintenance time for the routing information being less than or equal to a standby time.

18. The method of claim 9, further comprising recognizing a network interface controller, an audio-visual driver, a demultiplexer, a descrambler, and a filesystem.

* * * * *